J. C. Budd.
Fur Box.
N° 108,755.   Patented Nov. 1, 1870.

Witnesses:
A. C. Ashkettle
Theo. Tusche

Inventor:
Jno. C. Budd
per Munn & Co.
Attorneys.

United States Patent Office.

JOHN C. BUDD, OF NEW YORK, N. Y.

Letters Patent No. 108,755, dated November 1, 1870.

IMPROVEMENT IN MUFF, COLLAR, AND CUFF-BOXES.

The Schedule referred to in these Letters Patent and making part of the same.

*To all whom it may concern:*

Be it known that I, JOHN C. BUDD, of New York, in the county and State of New York, have invented a new and useful Improvement in Muff, Collar, and Cuff-Boxes; and I do hereby declare that the following is a full, clear, and exact description thereof, which will enable those skilled in the art to make and use the same, reference being had to the accompanying drawing forming part of this specification.

Similar letters of reference indicate corresponding parts.

My invention has for its object to furnish a neat, simple, and convenient box for the reception of a muff, collar, and cuffs; and It consists in a box constructed and arranged as hereinafter more fully described.

A is a hollow cylinder, made of a suitable length and diameter to contain the muff.

The cylinder A is attached at one side and end to the side and end of a rectangular box, B, so as to form a part of said box.

Figure 1:
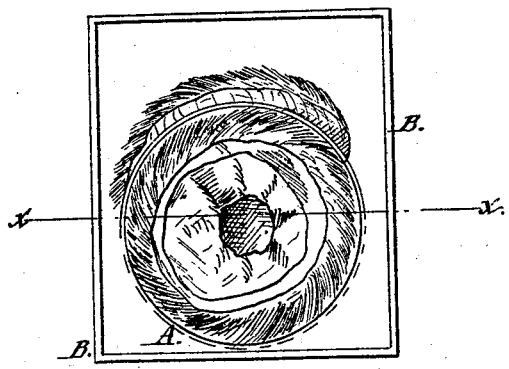
Figure 1 is a front view of my improved fur-box, the cover being removed.
Figure 2:
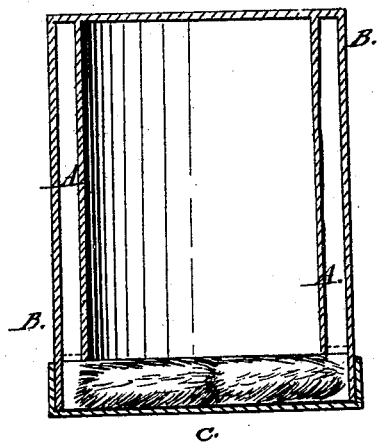
Figure 2 is a longitudinal section of the same, taken through the line $x\,x$, fig. 1.

The angles of the box B adjacent to the side to which the cylinder A is attached, are filled up or inclosed, as shown in figs. 1 and 2, so as to better support the said cylinder.

The box B is made of such a size as to leave a space around about one-half of the cylinder A to receive the collar, and also a space at the open end of the cylinder A to receive a part of the said collar when made large, and also to receive the cuffs.

This construction enables the muff, collar, and cuffs to be all kept in the same box, and in such a way that they can be easily and conveniently put into and removed from the said box without injury to the furs.

It also enables the merchant to conveniently display the furs, when desired, by simply removing the cover C and placing the boxes upon his shelves in the position shown in fig. 1.

It should also be observed that this construction enables the muff to be placed in and removed from the cylinder A by placing the hand in the interior of said muff, so that it is not necessary to take hold of the fur of the muff in putting it in and taking it out, which tends greatly to protect the fur from being injured.

Having thus described my invention,

I claim as new and desire to secure by Letters Patent—

The muff-box, when the cylinder A is placed within the rectangular box B, touching only one of its sides and one end, the surrounding space being left for the collar and cuffs, and when said box and cylinder are closed by one and the same cover, as herein shown and described.

The above specification of my invention signed by me this 26th day of November, 1867.

JOHN C. BUDD.

Witnesses:
  J. A. FRASER,
  JAMES T. GRAHAM.